(12) United States Patent
Reynar et al.

(10) Patent No.: US 6,446,041 B1
(45) Date of Patent: Sep. 3, 2002

(54) METHOD AND SYSTEM FOR PROVIDING AUDIO PLAYBACK OF A MULTI-SOURCE DOCUMENT

(75) Inventors: Jeffrey C. Reynar, Woodinville; Erik Rucker; Paul Kyong Hvan Kim, both of Seattle, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/428,259

(22) Filed: Oct. 27, 1999

(51) Int. Cl.⁷ .......................... G10L 13/08; G10L 15/26; G10L 21/06
(52) U.S. Cl. ...................... 704/260; 704/235; 704/278; 704/275
(58) Field of Search ................................ 704/260, 258, 704/270, 235, 278, 275

(56) References Cited

U.S. PATENT DOCUMENTS

| | | | | |
|---|---|---|---|---|
| 5,664,060 A | * | 9/1997 | Jarrett et al. ................ | 704/278 |
| 5,799,273 A | * | 8/1998 | Mitchell et al. ............. | 704/275 |
| 6,078,885 A | * | 6/2000 | Beutnagel ................... | 704/260 |
| 6,151,576 A | * | 11/2000 | Warnock et al. ............ | 704/260 |
| 6,199,042 B1 | * | 3/2001 | Kurzweil .................... | 704/278 |

* cited by examiner

Primary Examiner—Richemond Dorvil
Assistant Examiner—Daniel Nolan
(74) Attorney, Agent, or Firm—Merchant & Gould, PC

(57) ABSTRACT

A multi-source input and playback utility that accepts inputs from various sources, transcribes the inputs as text, and plays aloud user-selected portions of the text is disclosed. The user may select a portion of the text and request audio playback thereof. The utility examines each transcribed word in the selected text. If stored audio data is associated with a given word, that audio data is retrieved and played. If no audio data is associated, then a textto-speech entry or series of entries is retrieved and played instead.

30 Claims, 5 Drawing Sheets

METHOD AND SYSTEM FOR PROVIDING AUDIO PLAYBACK OF A MULTI-SOURCE DOCUMENT

TECHNICAL FIELD

The invention relates generally to the field of speech recognition, and more specifically to a multi-source input and playback utility for a display computer.

BACKGROUND OF THE INVENTION

Since the advent of the personal computer, human interaction with the computer has been primarily through the keyboard. Typically, when a user wants to input information into a computer, he types the information on a keyboard attached to the computer. Other input devices have supplemented the keyboard, including the mouse, touch-screen displays, integrated pointer devices, and scanners. Use of these other input devices has decreased the amount of user time spent in entering data or commands into the computer.

Computer-based speech recognition and speech recognition systems have also been used for data or command input into personal computers. Speech recognition and speech recognition systems convert human speech into a format understood by the computer. When a computer is equipped with a voice or speech recognition system, data input may be performed by merely speaking the data into a computer input device. The speed at which the user can speak is typically faster than conventional data entry. Therefore, the inherent speed in disseminating data through human speech is an advantage of incorporating speech recognition and speech recognition systems into personal computers. The increased efficiency of users operating personal computers equipped with speech recognition and speech recognition systems has encouraged the use of such systems in the workplace. Many workers in a variety of industries now utilize speech recognition and speech recognition systems for numerous applications. For example, computer software programs utilizing speech recognition and speech recognition technologies have been created by Dragon Systems, Inc. (Newton, Mass.), IBM Corporation (Armonk, N.Y.), and Lemout & Hauspie (Burlington, Mass.). When a user reads a document aloud or dictates to a speech recognition program, the program may enter the user's spoken words directly into a word processing program or other application operating on a personal computer.

Generally, computer-based speech recognition and speech recognition programs convert human speech into a series of digitized frequencies. These frequencies are matched against a previously stored set of words or speech elements, called phonemes.

A phoneme is the smallest unit of speech that distinguishes one sound from another in a spoken language. Each phoneme may have one or more corresponding allophones. An allophone is an acoustic manifestation of a phoneme. A particular phoneme may have many allophones, each sounding slightly different due to the position of the phoneme in a word or variant pronunciations in a language of the same letter set. For example, the phoneme /b/ is pronounced differently in the words "boy" and "beyond." Each pronunciation is an allophone of the phoneme /b/.

The utility processes these phonemes and converts them to text based on the most likely textual representation of the phoneme in a manner well known to those skilled in the art. The text is then displayed within a word processor or other application, such as a spreadsheet, database, web browser, or any program capable of receiving a voice input and converting it into display text or a program command. The multi-source input and playback utility may store the audio data. The audio data may be stored in a variety of formats on various storage media, including in volatile RAM, on long-term magnetic storage, or on optical media such as a CD-ROM. The audio data may be further compressed in order to minimize storage requirements. The utility may also link the stored audio data to the text generated by the audio data for future playback. When the computer determines correct matches for the series of frequencies, computer recognition of that portion of human speech is accomplished. The frequency matches are compiled until sufficient information is collected for the computer to react. The computer can then react to certain spoken words by storing the speech in a memory device, transcribing the speech as text in a document manipulable by a word processing program, or executing a command in an application program.

Natural speech input systems are expected to ultimately reach the marketplace. Such systems will not require the user to speak in any particular way for the computer to understand, but instead will be able to understand the difference between a user's command to the computer and information to be entered into the computer.

Lacking this technological advance, contemporary speech recognition and speech recognition systems are not completely reliable. Even with hardware and software modifications, the most proficient speech recognition and speech recognition systems attain no greater than 97–99% reliability. Internal and external factors may affect the reliability of speech recognition and speech recognition systems. Factors dependent upon the recognition technology itself include the finite set of words or phonemes inherent in the speaker's language, and the vocabulary of words to which the speech recognition software may compare the speaker's input. Environmental factors such as regional accents, external noise, and microphone quality may degrade the quality of the input, thus affecting the frequency of the user's words and introducing potential error into the word or phoneme matching.

Consequently, dictated documents transcribed by speech recognition software often contain recognition errors. Unlike typing errors, where simple mistakes such as the transposition of letters are easily identifiable and correctable, recognition errors are often more severe. Recognition errors typically are not the substitution or transposition of letters, but instead tend to be the wholesale substitution of similar-sounding words. For example, a classic speech recognition error is the transcription of the phrase "recognize speech" as "wreck a nice beach." While these phrases sound similar, they have totally different meanings. Further, an editor proofreading a document containing this recognition error may not immediately recall the intended phrase, leading to unnecessary confusion.

Traditionally, users have attempted to minimize this confusion by reading words aloud as they proofread the document. This practice assists in identifying intended phrases, since the vocal similarities are apparent when the document is read aloud. However, where significant time elapses between dictating and editing a document, the user may forget what the intended phrase was.

Known current speech recognition products attempt to solve this problem by storing the dictation session as audio data, and linking the stored audio data to the individual transcribed words. Users may select single words or text sequences and request playback of the audio corresponding to the selected portion.

While this aids a user in recognizing the intended transcription, a severe problem arises in the event that the user has edited the document in the time between dictation and requesting audio playback. A user is then presented with the prospect of requesting playback for a portion of a document generated through mixed input sources.

For example, a user may have dictated "I wish my computer could recognize speech," which the speech recognition system transcribed as "I wish my computer could wreck a nice beach." If the user then types the word "really" between "I" and "wish," the document has mixed input sources. Thus, when a user selects the sentence as it appears on the screen ("I really wish my computer could wreck a nice beach") and requests playback, no audio data is linked to the word "really," since it was typed and not dictated.

Known current speech recognition platforms disable the playback option in this situation. Instead, the speech recognition system returns an error message to the user, stating that playback is not available because audio data does not exist for all of the selected text. This forces a user to attempt to recall which portions of a document were typed and which dictated, and then reselect text accordingly. This solution is inherently frustrating, since it requires a user to attempt to recall a dictation session already unclear in the user's memory in order to access any audio playback whatsoever. Thus, there is a general need in the art for a method and system for reliably playing back audio in an intuitive format corresponding to a selected portion of a document. There is also a need for a method and system for filling in gaps in audio playback of a document wherein no audio data is available for portions of the document.

SUMMARY OF THE INVENTION

Generally stated, the invention is a multi-source input and playback utility for a personal computer. The multi-source input and playback utility accepts inputs from multiple input sources, converts these inputs into text, and displays the text on a display screen. When a user dictates text, the speech input is stored on a storage medium or in system memory as audio data. Text transcribed from speech input is linked to this stored audio data. Text transcribed from a writing tablet, or typed with a keyboard, has no link to any audio data. A user may edit the text as required through the use of a keyboard, mouse, or other input device. Typically, editorial changes are made by directly typing the changes into the text and so have no associated stored audio data.

The multi-source input and playback utility also vocalizes a text portion selected by a user. In the event that all of the selected text is linked to stored audio data, the audio data is played back. If a portion of the selected text has no associated audio data, then the utility retrieves a text-to-speech ("TTS") audio entry and fills in any gaps in stored audio playback with the retrieved entry. Thus, where a user selects a multi-source text portion for playback, the text vocalization will consist of a mix of played-back audio data as available and text-to-speech introduced as necessary.

The present invention meets the identified needs by providing a simple method for providing vocalization of text inputted through the use of multiple input methods, including non-speech inputs. By retrieving text-to-speech entries for words lacking any associated audio data, multi-source documents may be played aloud by a computer in their entirety rather than resorting to an error message. Further, continuous playback of all selected text minimizes user confusion otherwise caused by skipping non-dictated text portions.

DETAILED DESCRIPTION OF EMBODIMENTS

Figure 1:
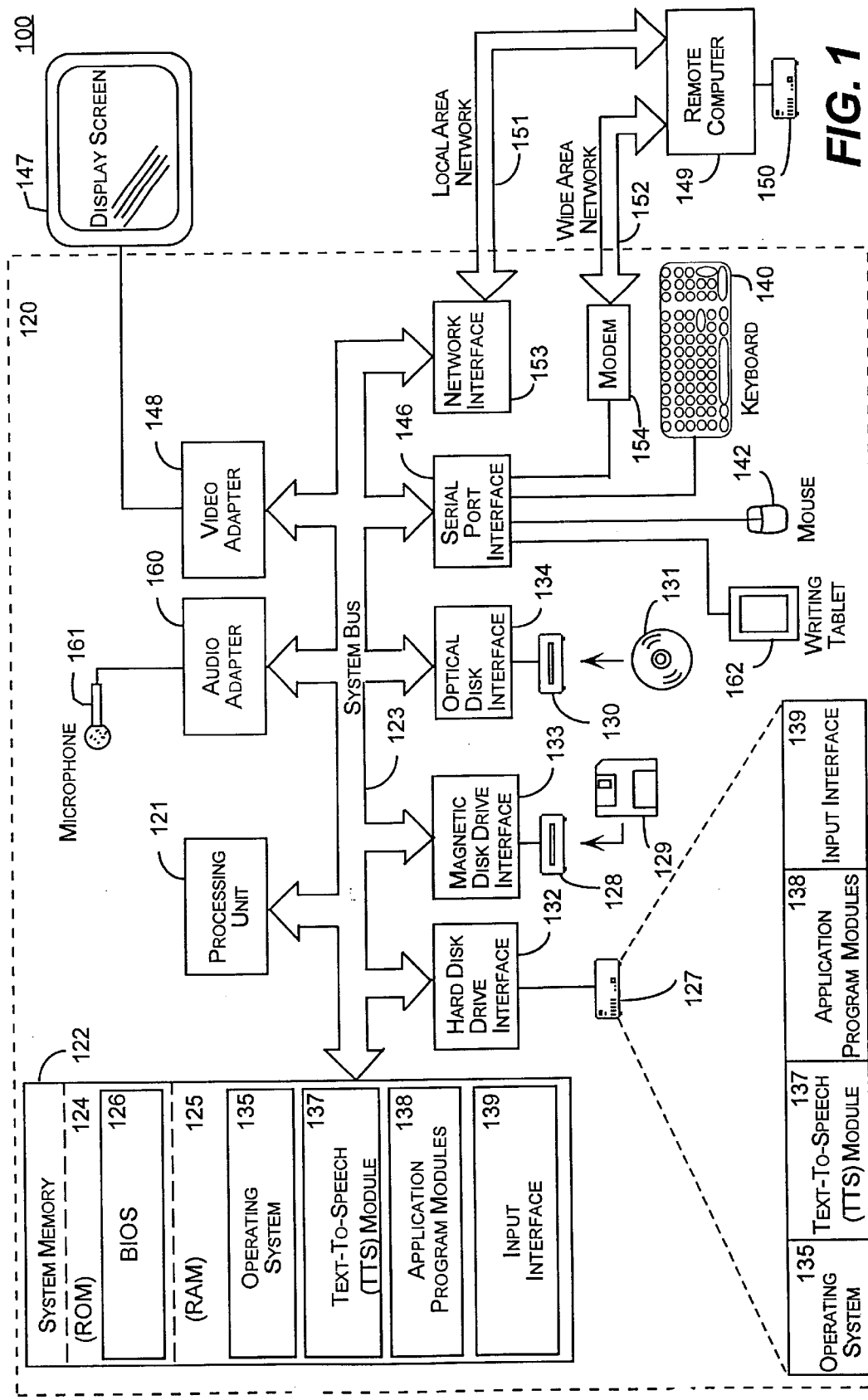
FIG. 1 is a block diagram of a personal computer that provides an exemplary operating environment for an embodiment of the present invention.

The present invention may be embodied in a multi-source input and playback utility that receives user inputs in various formats from different input devices and converts these user inputs to text. The user may input different data formats through the use of a variety of input devices, including a keyboard (for typed data), a microphone (for audio data), a stylus pad (for handwriting), a touchpad or mouse (for selection of an element from among a data group), and so on.

Once the user inputs have been converted, the text of the document can be displayed on a display device. Sample display devices include a CRT monitor, a touchscreen, an LCD screen display, and so on. A user may then select a portion of the text of the document and initiate an audio playback request.

The multi-source input and playback utility may misrecognize the user's speech due to a variety of factors, including accent, speaking speed, background noise, and so on. All of these factors may cause the utility to select a phoneme that fails to match the allophone spoken by the user. In this event, the transcribed text will be inaccurate.

Often times, the text may be sufficiently different from the dictation that a user cannot recall what was originally spoken based on the visual prompt of the transcribed document alone. In this event, the user may select a portion of text from the display screen and request that the multi-source input and playback utility play aloud the speech used to generate the selected text. Once the user selects a portion of text for playback, the utility highlights the text selected in order to provide visual feedback for the user. This feedback may alternately consist of displaying the selected text in a different color, causing the text to blink, or otherwise distinguishing the selected text from the rest of the document.

The utility then retrieves the audio data linked to the selected text and plays the audio data through a speaker. Optionally, the multi-source input and playback utility may add a visual cue indicating to which portion of a document the audio data being played back corresponds. For example, a cursor or ball may hover above the word corresponding to the current section of audio playback, and move as the playback continues. The word being played back may flash or be underlined on the display surface as the utility plays the corresponding audio data.

The user may desire to edit a dictated document to add new material or correct speech recognition errors. Although they may use the speech module again, commonly, a user edits the document by directly inputting changes into the multi-source input and playback utility through the use of a keyboard, rather than dictating additional changes.

Alternately, a user may correct a document by writing on a touchpad, writing stylus, or similar device.

Thus, the document may contain multi-source inputs: speech has been used to generate a first portion of the document, while typing or handwriting has been used to generate a second and other portions.

A user may request audio playback of a portion of the document that contains multi-source inputs. This results in the multi-source input and playback utility determining which words in the selected portion are linked to stored audio data and which are not. Typically, the utility performs this determination by checking each word sequentially, from first to last in the selection. Alternately, the utility may set a pointer for a portion of text for which audio data is available, directing the utility to the storage location for the word group, rather than checking on a word-byword basis. In the event that no audio data is linked to a word in the selected portion of the document, the multi-source input and playback utility determines whether a text-to-speech (TTS) entry exists corresponding to that word. If a corresponding TTS entry exists, the utility retrieves and plays the entry. If no TTS entry exists, the multi-source input and playback utility breaks the word into its component phonemes, retrieves the TTS entry corresponding to the most likely allophone for that phoneme, and plays the TTS entry. For example, the last name "Hemenway" may not have a corresponding TTS entry. Thus, the utility would break the word down into its component phonemes and choose the most likely allophone for these phonemes. Once the multi-source input and playback utility chooses a TTS entry for the phoneme, the utility plays back the entry. This procedure continues until all phonemes in the word are "vocalized" by the utility.

Alternately, the multi-source input and playback utility may parse a text selection and determine all words for which no stored audio data is linked. In this manner, the utility may determine the closest TTS entry for all non-linked words at once, rather than making multiple calls to a TTS module. This serves to minimize CPU usage on the part of the utility by keeping the number of TTS calls to a minimum. In this alternative, all linked audio data is retrieved and held in system memory until the multi-source input and playback utility obtains a TTS entry for each non-linked word. The utility then plays back the audio data and TTS entries in order from system memory, rather than continuously streaming the audio data and TTS entries from a storage medium.

The utility may also speed up, slow down, or otherwise alter the TTS entry prior to playback in order to match the stored audio data. The utility may analyze the audio data waveform, extracting such information as speech speed, pitch, tone, and timbre. The utility may then alter these characteristics in the TTS entry in order to more closely parallel the sound of the TTS entry to a speaker's own speech patterns.

An alternate embodiment may play back audio corresponding to the dictated portions of the text, as originally dictated. In the current example, the selected phrase "I really wish my computer could wreck a nice beach" would be played back as, "I wish my computer could recognize speech." When editing changes or typed additions to a document are extensive, this may lead to a situation where the user cannot follow the audio playback due to the extensive intervening changes.

Another possible embodiment is to insert pauses in the playback at positions corresponding to typed words. Recall the example where the phrase "I wish my computer could recognize speech" was edited to insert the word "really" between "I" and "wish." In this embodiment, audio playback for the selected text would sound like, "I" [pause] "wish my computer could recognize speech," where the pause indicates the presence of the typed word "really." The stopping and restarting of audio playback may lead a user to believe that the audio has ceased, when in fact a pause point has been reached. Further, the extent of the pause may be significant where entire sentences or paragraphs have been inserted into a dictated document.

Although the invention is described using a word processor as an exemplary application, the invention is equally applicable to many other applications. For example, alternate applications may include a spreadsheet, browser, electronic mail program, music transcription program, CAD program, or operating system, and others readily apparent to those skilled in the art.

The multi-source input and playback utility is comprised of various program modules described hereafter. One skilled in the art will recognize that the modules may be combined in various ways and that new program modules could be created to accomplish similar results. For example, the input interface and text-to-speech module may be part of the operating system or of the word processor, or may stand alone as described. Similarly, the handwriting recognition program module, the speech recognition program module, and the input method editor may be discrete programs, or may be a component of either the word processor or the operating system or a standalone package of all three.

Exemplary Operating Environment

FIG. 1 and the following discussion are intended to provide a brief and general description of a suitable computing environment 100 for an implementation of the present invention. The exemplary operating environment 100 includes a conventional personal computer system 120, including a processing unit 121, a system memory 122, and a system bus 123 that couples the system memory 122 to the processing unit 121. The system memory 122 includes read only memory (ROM) 124 and random access memory (RAM) 125. A basic input/output system 126 (BIOS), containing the basic routines that help to transfer information between elements within the personal computer system 120, such as during start-up, is stored in ROM 124.

The personal computer system 120 further includes a hard disk drive 127, a magnetic disk drive 128, e.g., to read from or write to a removable magnetic disk 129, and an optical disk drive 130, e.g., for reading a CD-ROM disk 131 or to read from or write to other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage for the personal computer system 120. Although the description of computer-readable media above refers to a hard disk, a removable magnetic disk and a CD-ROM disk, it should be appreciated by those skilled in the art that other types of media that are readable by a computer system, such as magnetic cassettes, flash memory cards, digital video disks, Bernoulli cartridges, and the like, may also be used in the exemplary operating environment.

A user may enter commands and information into the personal computer 120 through conventional input devices, including a keyboard 140 and pointing device, such as a mouse 142. A microphone 161 may be used to enter audio input, such as speech, into the computer system 120. A user may enter graphical information, such as drawings or handwriting, into the computer system by drawing the graphical information on a writing tablet 162 using a stylus. The computer system 120 may include additional input devices (not shown), such as a joystick, game pad, satellite dish, scanner, or the like. The microphone 161 can be connected to the processing unit 121 through an audio adapter 160 that is coupled to the system bus. The other input devices are often connected to the processing unit 121 through a serial port interface 146 that is coupled to the system bus, but may be connected by other interfaces, such as a game port or a universal serial bus (USB).

A display screen 147 or other type of display device is also connected to the system bus 123 via an interface, such as a video adapter 148. In addition to the monitor, personal computer systems typically include other peripheral output devices (not shown), such as speakers or printers.

The personal computer system 120 may operate in a networked environment using logical connections to one or more remote computer systems, such as a remote computer system 149. The remote computer system 149 may be a server, a router, a peer device or other common network node, and typically includes many or all of the elements described relative to the personal computer system 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, the personal computer system 120 is connected to the LAN 151 through a network interface 153. When used in a WAN networking environment, the personal computer system 120 typically includes a modem 154 or other means for establishing communications over a WAN 152, such as the Internet. The modem 154, which may be internal or external, is connected to the system bus 123 via the serial port interface 146. In a networked environment, program modules depicted relative to the personal computer system 120, or portions thereof, may be stored in the remote memory storage device 150. It will be appreciated that the network connections shown are exemplary and other means of establishing a communications link between the computer systems may be used. It will be further appreciated that the invention could equivalently be implemented on host or server computer systems other than personal computer systems, and could equivalently be transmitted to the host computer system by means other than a CD-ROM, for example, by way of the network connection interface 153.

A number of program modules may be stored in the drives and RAM 125 of the computer system 120. Program modules control how the computer system 120 functions and interacts with the user, with I/O devices or with other computers. Program modules include routines, operating system 135, application program modules 138, data structures, browsers, and other software or firmware components. The invention may conveniently be implemented in one or more program modules, such as a text-to-speech (TTS) module 137 and an input interface program module 139, each of which is based upon the methods described in the detailed description.

Figure 2:
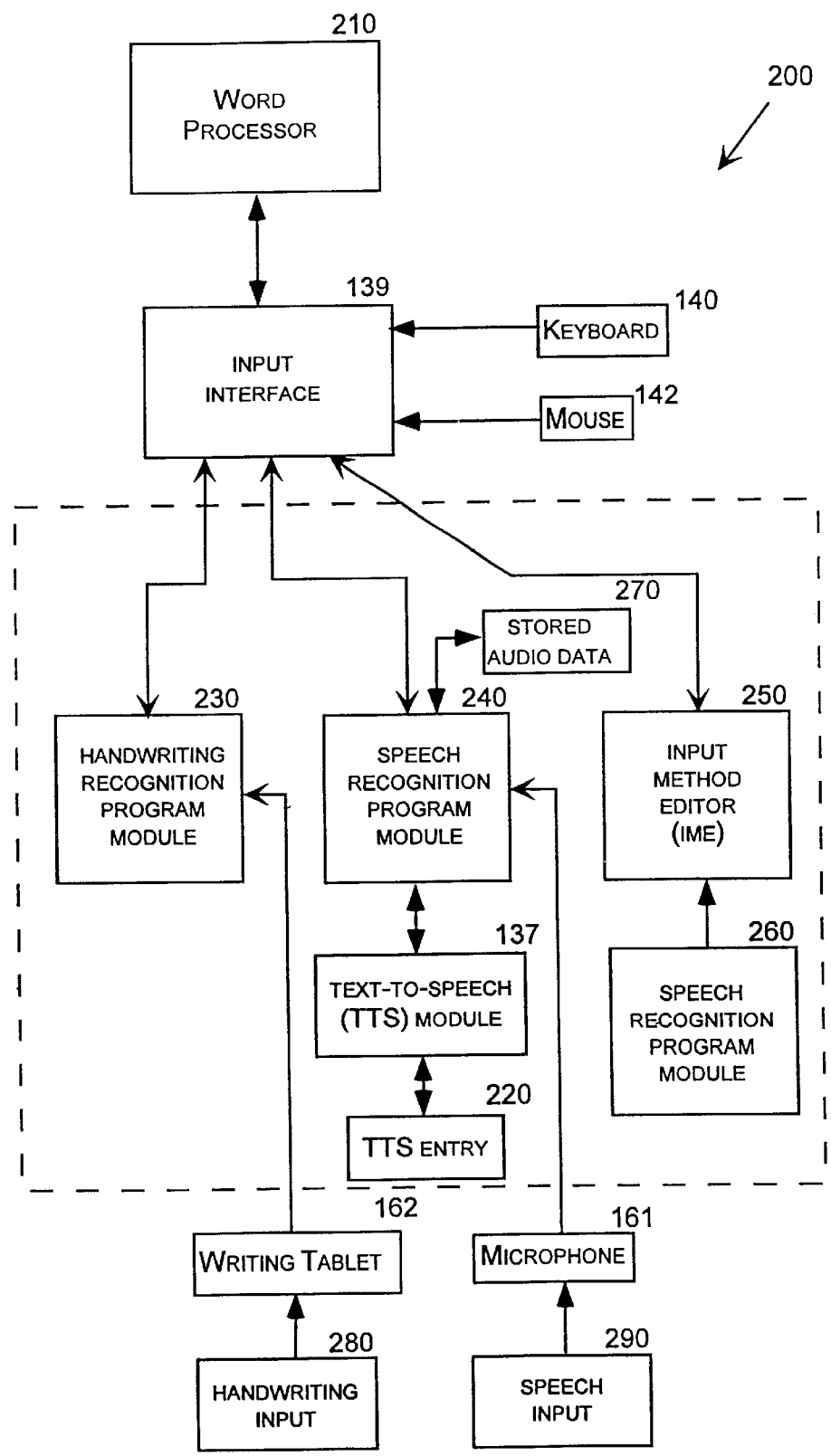
FIG. 2 is a block diagram showing the software architecture of a multi-source input and playback system.

The application program modules 138 may comprise a variety of applications used in conjunction with the present invention, some of which are shown in FIG. 2. The purposes of and interactions between some of these program modules are discussed more fully in the text describing FIG. 2. These include a word processor program 210 (such as WORD™ software, produced by Microsoft Corporation of Redmond, Wash.), a text-to-speech module 137, a first speech recognition program module 240, and an input method editor (IME) 250.

No particular programming language is described for carrying out the various procedures described hereinafter because the operations, steps, and procedures described and illustrated in the accompanying drawings are sufficiently disclosed to permit one of ordinary skill in the art to practice an exemplary embodiment of the present invention. Moreover, there are many computers and operating systems which may be used in practicing an exemplary embodiment, and therefore no detailed computer program could be provided which would be applicable to all of these many different systems. Each user of a particular computer will be aware of the language and tools which are most useful for that user's needs and purposes.

Those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Configuration Of The Multi-Source Input And Playback Utility

FIG. 2 is a block diagram displaying the multi-source input and playback utility 200. Generally, the purpose of the multi-source input and playback utility 200 is to receive user input from multiple sources, process that data into text, and play back the text as audio. Sample input sources include handwriting, speech, and typing.

The multi-source input and playback utility 200 is comprised of several program modules. These program modules allow a user to enter text into a word processor from a variety of sources. Once inputted, the user data is transformed into text and displayed on a display surface. A user selects the text for which he wishes to hear audio data, and the multi-source input and playback utility 200 processes the request through the proper program modules in order to produce audio playback.

Typical input sources within the multi-source input and playback utility 200 include a handwriting recognition program module 230, first speech recognition program module 240, input method editor (IME) 250, a second speech recognition program module 240, and a keyboard 140 or other direct input device such as a mouse 142. Each input program module is discussed in turn.

The handwriting recognition program module 230 receives handwriting input 280 from the user. The user generates the handwriting input 280 by writing on the writing tablet 162 with a stylus or a mouse, or touchscreen, etc. The handwriting input 280 is preferably directed to the handwriting recognition program module 230 by a writing tablet driver module resident in the operating system 135.

The first speech recognition program module 240 receives speech input 290 from the user through a microphone 161 run by a microphone driver module resident in the operating system 135. Speech is often difficult to interpret because many words that sound alike have different meanings and spellings. The first speech recognition program module 240 parses speech input 290 by breaking the speech down into component phonemes and generating textual output based on each phoneme. Further, the first speech recognition program module 240 converts speech input 290 into a waveform that may be stored on a long-term storage medium as stored audio data 270. This stored audio data 270 may later be accessed by the word processor 210 for audio playback.

The input method editor (IME) 250 converts phonetic input into ideographic text for specific foreign languages. The input into an IME 250 may, for example, be typed text entered into the computer through a keyboard 140 and mouse 142, or may be speech data entered through the use of a microphone 161.

An IME 250 is especially useful for creating ideograms in Asian languages. Because there are many more ideograms in such languages than there are keys on a keyboard, entering a particular ideogram into the computer is problematic without an IME 250. For example, in a Chinese IME 250, a user types an English-character phonetic spelling for a desired Chinese ideogram. Since many Chinese ideograms have similar pronunciations, the typed phonetic spellings may represent any one of a number of different Chinese characters. The IME 250 then chooses the most probable candidate from an internally generated candidate list, or alternately provides the user with the most probable candidates intended by the typed phonetic spelling so that the user can choose the correct one. The candidate list is generated based on the phonetic spelling provided by the user, or alternately from the set of phonemes comprising a user's speech input 290.

To illustrate the functioning of the IME 250, speech may be entered into the computer and used to produce Japanese text. The speech is submitted to a second speech recognition program module 240. In operation, the second speech recognition program module 240 functions much like the first speech recognition program module 240, but it is illustrated as a distinct unit because it may have a different speech interpretation engine and may have a different type of output. That is, the second speech recognition program module 240 may interpret a different language than the first speech recognition program module 240.

The second speech recognition program module 240 may then produce English text alternatives from the spoken English words. One or more of the English language text alternatives may then be used as input into the IME 250, which translates the English language text input into Japanese characters. Each alternative input into the IME 250 produces a separate potential candidate list, though it should be appreciated that there may be overlap between the alternatives forming the candidate lists of two distinct inputs into the IME 250.

It should be understood that the IME 250 and the second speech recognition program module 240 may not interface directly. Thus, for example, input from second speech recognition program module 240 to IME 250 may travel through an interface program module, such as input interface 139, to which each input source is directly connected.

Although examples have been given for both English and Japanese, it should be understood that the speech recognition program module 240 and word processor 210 may receive and display inputs from multiple languages. For example, the word processor 210 may be configured to display text for languages, which are read in an order other than from left to right, such as Nastiliq. Further, the word processor 210 may also display text wherein the individual characters change shape according to the surrounding characters, such as in the Hebrew and Arabic languages, wherein letters are in a cursive script (i.e., like cursive handwriting in the English language) and may be one or more shapes depending on whether the letter is at the beginning, middle or end of a word (i.e., depending on the surrounding letters and/or characters or lack thereof).

The word processor 210 receives input from a user and displays output via the input interface 139. The output is displayed either as text on a display screen, or as audio data through a speaker. The word processor 210 acts to provide an interface between a user of the multi-source input and playback utility 200 and the component program modules.

The word processor 210 receives, though input interface 139, text representing the most likely alternative for handwriting inputs 280 and speech inputs 290 used to enter data into the word processor. Some input sources, such as text generated by typing on a keyboard 140, do not require the generation of alternatives by the input interface 139, and are passed along exactly as received. The word processor 210 combines all source data into a multi-source text string that is presented to the user. Although the word processor 210 may not indicate to the user the source of each word in the text, the word processor nonetheless maintains a record of the source of each text component. An alternate embodiment may indicate the source of each word in a variety of ways; for example, words may be shown in different colors or fonts depending on the input method of the word.

The word processor 210 also allows a user to select a section of text and to request audio playback for that selection. The word processor retrieves stored audio data 270 linked to the text selection and plays the audio data through a speaker or other output device. If no stored audio data 270 is linked to any portion of the text selection, the word processor 210 passes a request to the text-to-speech module 137 through the input interface 139 to retrieve a TTS entry 220 corresponding to the portion of the text selection. The word processor then receives the corresponding TTS entry via the first speech recognition program module 240 and input interface 139 and plays the TTS entry through a speaker. The word processor 210 parses each word within the text selection in turn, and retrieves and plays either stored audio data 270 or a TTS entry 220 accordingly. To a user of the multi-source input and playback utility 200, a continuous stream of mixed stored audio data and TTS entries is heard, sounding out the text selection. The details of audio playback for a text selection are discussed in more detail with respect to FIG. 4.

User Interface For The Multi-Source Input and Playback Utility

Figure 3A:
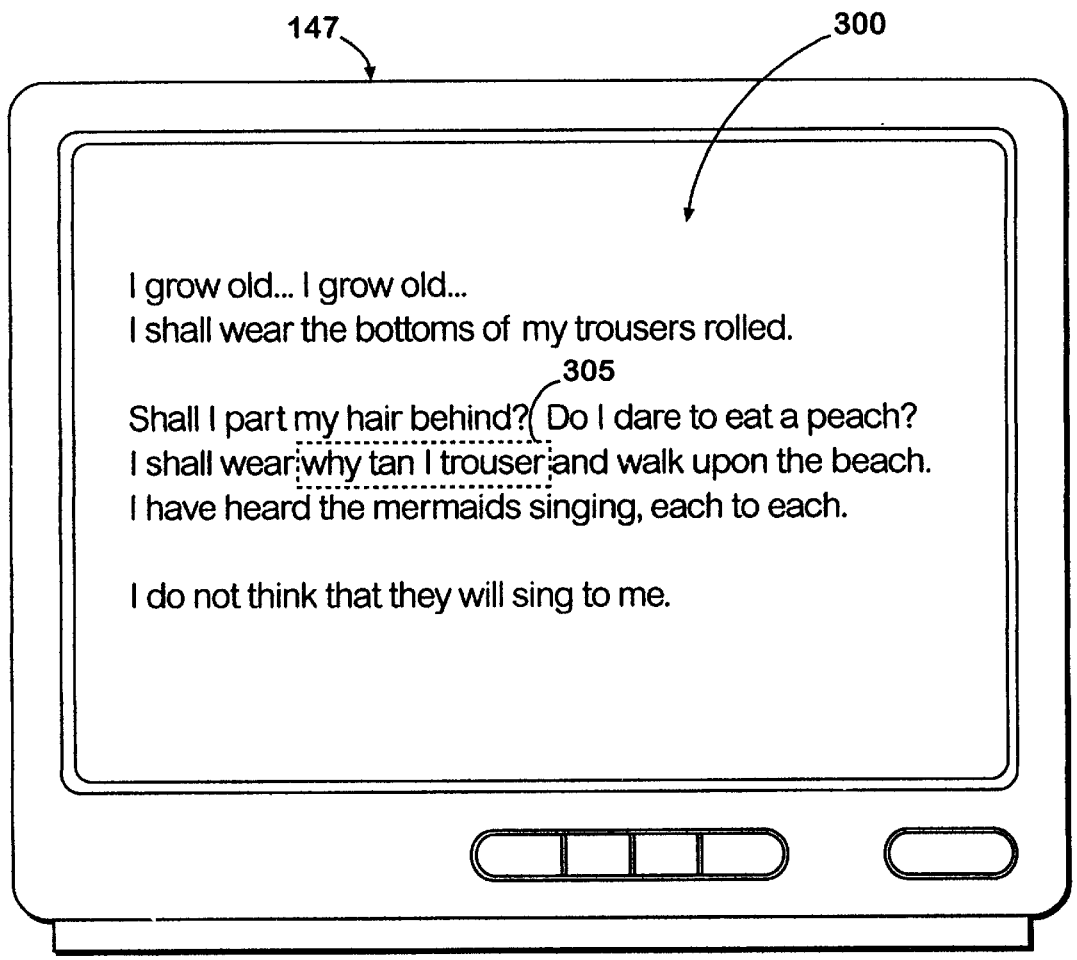
FIG. 3A is a screen display illustrating a portion of a text document inputted through use of a multi-source input and playback system.

FIG. 3A shows a sample dictated document 300 displayed on a display screen 147 in accordance with an embodiment of the present invention. The speech input 290 of FIG. 2 is transcribed by the first speech recognition program module 240 and displayed as a dictated document 300 by the word processor 210. In this example, the dictated document comprises a portion of a poem. A portion of the dictation has been misrecognized by the first speech recognition program module 240. Specifically, the phrase 305 (as shown in the dotted rectangle) "white flannel trousers" has been erroneously transcribed as "why tan 1 trouser" by the first speech recognition program module 240.

Figure 3B:
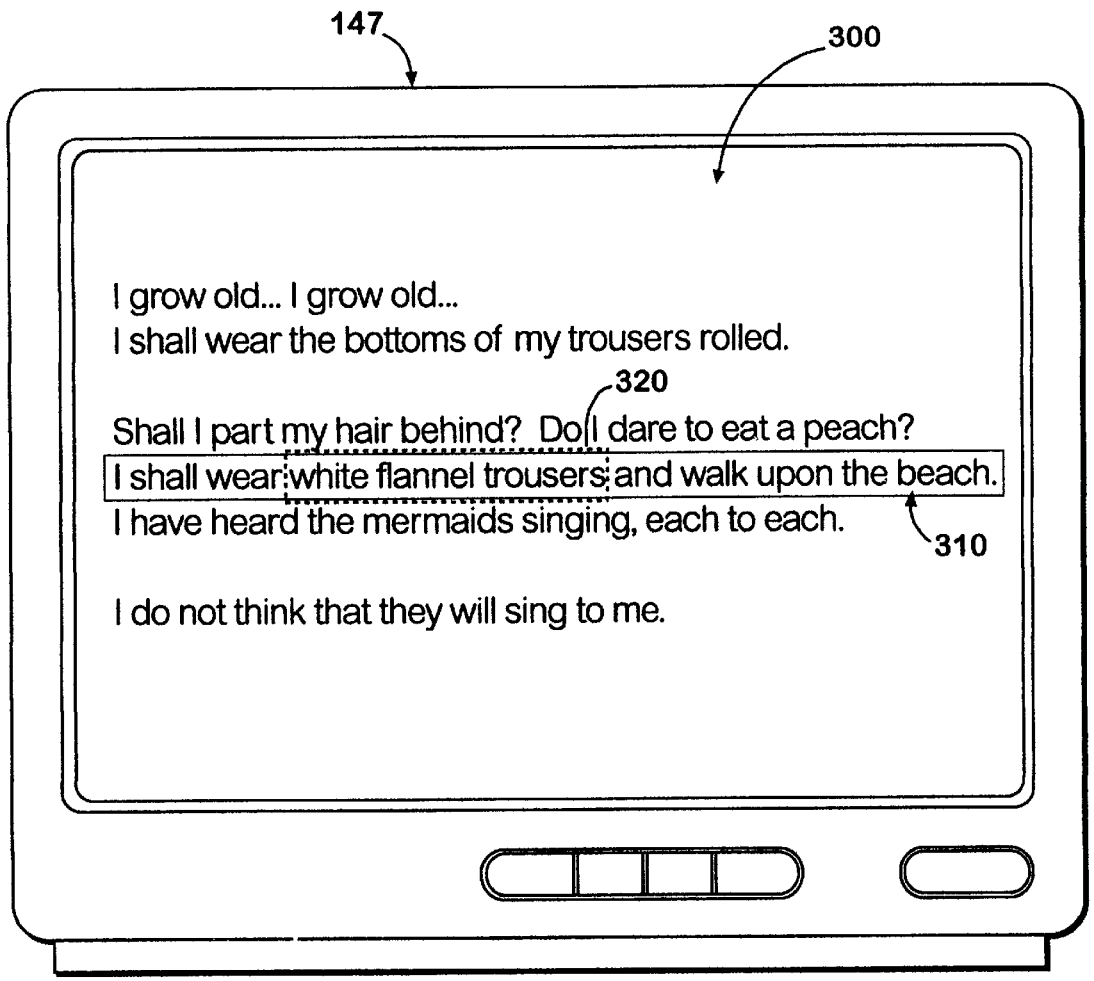
FIG. 3B is a screen display illustrating a portion of an edited text document chosen for audio playback.

Tuning to FIG. 3B, an edited version of document 300 wherein a portion 310 has been selected for audio playback is shown. In FIG. 3A, the misrecognized phrase 305 has been edited to insert the proper words, replacing "why tan 1 trouser" with the phrase "white flannel trousers." Further, a text portion 310 of the document has been selected for audio playback. In order to provide user feedback showing what part of the document 300 is being vocalized by the multi-source input and playback utility 200, the text portion 310 corresponding to the playback is highlighted by the utility. Note that the text portion selected for audio playback includes the edited portion 320 (shown in FIG. 3B as the dotted rectangle) of the document 300. Presuming the editing was performed by a user typing at a keyboard, document 300 is now a multi-source document. Likewise, text portion 310 is a multi-source text portion. Thus, the phrase "white flannel trousers" has no associated audio data, insofar as it was entered through use of a keyboard. Therefore, when the utility 200 initiates playback, the words "white flannel trousers" of the selected text portion 310 will be vocalized through the use of text-to-speech entries 220 provided by the text-to-speech module 137.

In order to further enhance user feedback, the multi-source input and playback utility 200 may include an indicator of exactly which word is being vocalized. For example, as the audio data or text-to-speech entry is played, the corresponding word may flash or change color.

Operation Of The Multi-Source Input And Playback Utility

Figure 4:
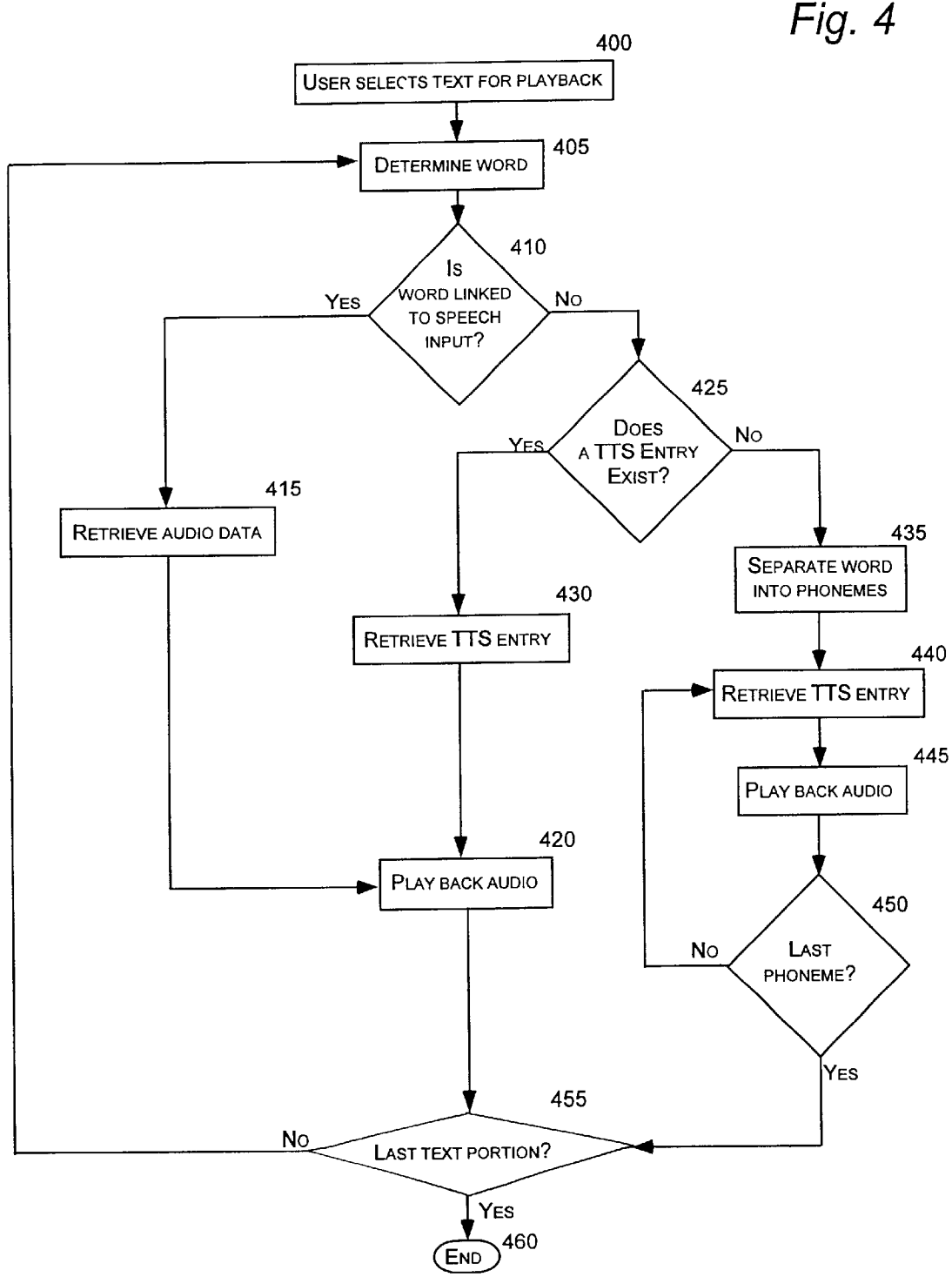
FIG. 4 is a logic flow diagram illustrating a method for selecting and vocalizing a portion of a multi-source document.

Throughout the discussion of FIG. 4, reference will occasionally be made to portions of the functional block diagram of the multi-source input and playback utility 200 depicted in FIG. 2.

FIG. 4 shows a flowchart detailing the steps executed when playing audio for a selected portion of a document. First, in step 400 a user selects the text portion of a document which he desires the multi-source input and playback utility to play. Once the playback text is selected, the word processor 210 determines in step 405 the boundaries of the first word of the text portion 300. Typically, the word boundary is indicated by the presence of a non-alphanumeric character, such as a space, asterisk, comma, period, or other character. However for some languages, words are not delimited. Instead, the computer must use a form of language understanding to determine the word breaks. Examples of languages wherein words are not delimited include, Japanese, Chinese, and Thai. This word is hereinafter referred to as the "current word."

Once the word processor 210 determines the size and boundaries of the current word, the multi-source input and playback utility 200 determines in step 410 whether the word is linked to stored audio data 270 saved from a previous dictation session.

If the multi-source input and playback utility 200 determines in step 410 that stored audio data 270 is linked to a word, then the utility retrieves this audio data in step 415. The word processor 210 requests the stored audio data from the input interface 139, which in turn recovers the data from a magnetic disk drive 128 or other medium. The input interface 139 then passes the audio back to the word processor 210.

Following step 415, the multi-source input and playback utility 200 plays the audio data aloud in step 420. Typically, the word processor 210 employs a separate program module or portion of the operating system to handle playback of audio data, although alternate embodiments may embed the playback program module within the word processor.

Next, in step 455, the multi-source input and playback utility 200 determines whether the word just processed in steps 405 through 420 is the final word of the text selected by the user in step 400. In the event that no more words remain in the selection, the utility enters end step 460 and halts. If additional words remain, then the multi-source input and playback utility 200 returns to step 405 to determine the bounds of the next word in sequence.

Alternately, the utility 200 may determine in step 410 that no speech input is linked to the word. This will be the case where the word being processed by the multi-source input and playback utility 200 was typed by the user during a document editing process, for example. In this event, the utility checks for the existence of a TTS entry 220 corresponding to the current word. The word processor 210 performs this check by querying the TTS module 137 through the first speech recognition program module 240 for the existence of a TTS entry identified with the current word.

If such a TTS entry 220 exists, the TTS module 137 retrieves the TTS entry and returns it to the word processor 210 through the input interface 139. Alternately, the TTS module 137 determines which of a plurality of TTS entries to retrieve by examining the surrounding TTS entries corresponding to the phonemes on either side of the current TTS entry, and selecting the one phonetically most likely to match the surrounding TTS entries. The TTS module 137 performs this action in step 430.

Once the TTS entry has been received by the word processor, the multi-source input and playback utility 200 plays back the TTS entry in step 420, as detailed above with respect to stored audio data 270. Optionally, the audible characteristics of the TTS entry, such as pitch, tone, and speed, may be manipulated by the utility prior to playback in step 420 in order to more closely match the sound of the TTS entry to that of the stored audio data. This minimizes the dissonance between the two types of audio playback. Once the TTS entry 220 has been vocalized, step 455 is executed as detailed above.

If no TTS entry corresponding to the current word exists, then the word processor 210 executes step 435, separating the word into its constituent phonemes. In step 440, the word processor passes the first of these phonemes to the first speech recognition program module 240 via the input interface 139. Also as part of step 440, the speech recognition program module 240 requests the TTS entry 220 corresponding to the first phoneme from the text-to-speech module 137. Specifically, the first speech recognition program module 240 analyzes the phoneme passed by the word processor 210, and requests from the TTS module the TTS entry 220 comprising the most likely allophone of the phoneme. Step 440 ends with the retrieval of the TTS entry and its relay back to the word processor 210.

Conclusion

The multi-source input and playback utility 200 may include additional functionality, for example, allowing the user to manually vary the playback rate. The utility 200 may also accept inputs from other input sources beyond those listed, including alternate input devices or control signals from different programs. Many other modifications and additional features will become evident in view of the preceding description of the embodiments of the invention. It should be understood, therefore, that the foregoing relates only to certain embodiments of the invention, and that numerous changes may be made therein without departing from the spirit and scope of the invention as defined by the following claims.

We claim:

1. A method for linking audio to text in a multi-source input and playback system, said method comprising the steps of:

dictating one or more words;

transcribing the one or more words to form a first text set within a document;

storing the first text set on a storage medium;

comparing each audio element of a stored audio version of the one or more words with each corresponding text element of the first text set;

inserting second text into the document, wherein the second text is non-audio text;

associating a text-to-speech entry with the second text; and forming a continuous stream of audio from (1) stored audio data corresponding to the first text set and (2) the text-to-speech entry corresponding to the second text.

2. The method of claim 1, further comprising the step of playing back the continuous stream of audio in an order corresponding to a placement of said first text and said second text within the document.

3. The method of claim 2, wherein said second text is inserted between a first dictated word and a second dictated word.

4. The method of claim 2, wherein a first portion of the second text precedes a first dictated word and a second portion of the second text follows the first dictated word.

5. The method of claim 2, wherein a first portion of the first text set and a second portion of the first text set are separated from one another by a portion of the second text, and wherein a first portion of the second text and a second portion of the second text are separated from one another by a portion of the first text set.

6. A computer configured for performing the method of claim 2.

7. The method of claim 2, wherein the non-audio text is inserted into the document by one or more of (a) typing the non-audio text into the document using a keyboard, (b) copying the non-audio text into the document using a mouse, and (c) handwriting text which is converted to non-audio text using a handwriting recognition program module.

8. A computer configured for performing the method of claim 1.

9. A computer-implemented method for creating and vocalizing a document, comprising the steps of:

speaking one or more words into an input device;

transcribing the one or more words as a first text entry within a document;

storing the one or more words on a storage-medium;

comparing each word of the one or more words with each word of said first text entry;

inputting a second text entry within the document, wherein the step of inputting the second text entry does not comprise speaking;

assigning a text-to-speech entry to said second text entry; and playing back the one or more words and the text-to-speech entry in an order corresponding to a placement of the first and second entries within said document.

10. The method of claim 9, further comprising analyzing one or more vocal characteristics of the one or more words and adjusting one or more properties of the text-to-speech entry to match the one or more vocal characteristics of the one or more words.

11. The method of claim 10, wherein a prosody element of the text-to-speech entry is adjusted.

12. The method of claim 11, wherein the prosody element comprises pitch, speed, volume, or a combination thereof.

13. The method of claim 9, further comprising:

displaying the document on a display screen; and shading the text-to-speech entry.

14. The method of claim 9, wherein a cessation of the first text entry and a beginning of the second text entry is signaled by a non-alphanumeric character.

15. The method of claim 9, wherein the first and second text entries comprise pictographic characters.

16. The method of claim 15, wherein the pictographic characters are Kanji characters.

17. A computer configured for performing the method of claim 9.

18. The method of claim 9, wherein a shape of a letter within a word of the first text entry, the second text entry, or both, varies depending on a location of the letter within the word.

19. The method of claim 9, wherein the first and second text entries are read from right to left.

20. The method of claim 9, wherein the second text entry is inputted by one or more of (a) typing the second text entry into the document using a keyboard, (b) copying the second text entry into the document using a mouse, and (c) handwriting text which is converted to the second text entry using a handwriting recognition program module.

21. A computer-implemented method for providing audio playback of a text document, comprising the steps of:

selecting a text set comprising at least one word, wherein each word comprises at least one phoneme;

determining whether a user-dictated audio input corresponds to a first word of the text set;

in the event that a user-dictated audio input corresponds to the first word, playing the user-dictated audio input through an audio output device;

otherwise, determining whether one of a plurality of text-to-speech entries corresponds to the first word;

in the event that a text-to-speech entry corresponds to the first word, playing the text-to-speech entry through an audio output device;

otherwise, determining which of the plurality of text-to-speech entries corresponds to a phoneme of the first word; and in response to determining which of the plurality of text-to-speech entries corresponds to the phoneme of the first word, playing the corresponding text-to-speech entry through an audio output device.

22. The method of claim 21, wherein:

the text set comprises a plurality of words;

the first word corresponds to a user-dictated audio input; and a second word within the plurality of words corresponds to a text-to-speech entry.

23. The method of claim 22, further comprising:

playing back the user-dictated audio input and the text-to-speech entry in an order corresponding to a placement of the first and second words in the text set.

24. The method of claim 21, further comprising:

determining a plurality of words for which no corresponding user dictated audio input exists;

passing the plurality of words to a text-to-speech module; and retrieving a text-to-speech entry for each of the plurality of words.

25. A computer configured for performing the method of claim 21.

26. A method for compiling and evaluating text within a document, said method comprising the steps of:

inputting dictated words into a document;

converting said dictated words into a first text set within said document by use of a voice recognition process;

storing said dictated words separately but linked to said first text set for later audio playback;

inputting non-audio text into said document as a second text set within said document, wherein said non-audio text is inputted by one or more of (a) typing the non-audio text into the document using a keyboard, (b) copying the non-audio text into the document using a mouse, and (c) handwriting text which is converted to the non-audio text using a handwriting recognition program module; and playing back audio corresponding to said first and second text sets in an order corresponding to a placement of said first and second text sets within said document, wherein a first portion of said audio corresponding to said first text set is provided by playback of said stored dictated words, and a second portion of said audio corresponding to said second text set is provided by playback of a text-to-speech process.

27. The method of claim 26, wherein said non-audio text is supplied by typing a text entry into said document using a keyboard.

28. The method of claim 26, wherein said non-audio text is supplied by copying a text entry into said document using a mouse.

29. The method of claim 26, herein said non-audio text is supplied by handwriting text onto a writing tablet, wherein the handwritten text is converted to a text entry for said document using a handwriting recognition program module.

30. The method of claim 26, wherein a visual cue corresponding to the audio playback is displayed on a display screen.

* * * * *